UNITED STATES PATENT OFFICE.

W. C. DODGE, OF WASHINGTON, DISTRICT OF COLUMBIA.

IMPROVED COMPOSITION FOR WALKS, PAVEMENTS, &c.

Specification forming part of Letters Patent No. 58,789, dated October 16, 1866.

*To all whom it may concern:*

Be it known that I, WILLIAM C. DODGE, of Washington, in the county of Washington and District of Columbia, have invented certain new and useful Improvements in Composition for Walks, &c.; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention has for its object the making of pavements, cellar and cistern walls, and similar structures of a cheap and durable composition.

To construct a walk or pavement on my plan I first remove the earth to the proper depth—say four or five inches—and level the bed down smooth. I then take broken stone or gravel, oyster-shells, and vitreous cinders, and mix them thoroughly with coal-tar, and spread the mass thus prepared on the ground to the depth of two or more inches. I then take of finer gravel about twenty parts, of sand ten parts, of ashes ten parts, and of sulphur two parts, and after mixing them thoroughly with sufficient coal-tar or asphaltum to form the whole into a pasty mass, I spread a layer of this last mixture over the bed already spread, and spread over the whole a thin layer of clean sand, after which it is rolled down smooth and compact with a suitable roller, which completes the operation.

In preparing the first layer I prefer to use the coal-tar in its natural state without heating, as by this means the mass is more tough and less liable to crack or break. In preparing the second mixture or coating it may be advisable to heat the tar and mix the sulphur into it before applying the tar to the other ingredients; but in doing this the tar should be heated as little as possible, only sufficient to insure a thorough incorporation of the sulphur.

In using the composition for the floors of cellars and cisterns I proceed in the same manner; but in lining the sides there will be less of the coarser material used, and the whole may be mixed into one mass and applied at once. In this manner I also propose to use it for forming roofs. It is also obvious that walls may be formed by the same process, still coarser stone being used for the body of the wall.

Having thus described my invention, what I claim is—

The composition and process herein described, when applied as and for the purposes set forth.

WILLIAM C. DODGE.

Witnesses:
 P. T. DODGE,
 EDM. F. BROWN.